(12) United States Patent
Jiang et al.

(10) Patent No.: US 11,659,193 B2
(45) Date of Patent: May 23, 2023

(54) FRAMEWORK FOR VIDEO CONFERENCING BASED ON FACE RESTORATION

(71) Applicant: TENCENT AMERICA LLC, Palo Alto, CA (US)

(72) Inventors: Wei Jiang, Palo Alto, CA (US); Wei Wang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/490,103

(22) Filed: Sep. 30, 2021

(65) Prior Publication Data
US 2022/0217371 A1 Jul. 7, 2022

Related U.S. Application Data

(60) Provisional application No. 63/134,522, filed on Jan. 6, 2021.

(51) Int. Cl.
| | |
|---|---|
| *H04N 19/29* | (2014.01) |
| *H04N 19/30* | (2014.01) |
| *H04N 19/85* | (2014.01) |
| *H04N 19/17* | (2014.01) |
| *G06T 3/40* | (2006.01) |
| *G06T 7/62* | (2017.01) |
| *G06V 40/16* | (2022.01) |
| *G06N 3/045* | (2023.01) |

(52) U.S. Cl.
CPC ............. *H04N 19/29* (2014.11); *G06N 3/045* (2023.01); *G06T 3/40* (2013.01); *G06T 7/62* (2017.01); *G06V 40/161* (2022.01); *H04N 19/17* (2014.11); *H04N 19/30* (2014.11); *H04N 19/85* (2014.11); *G06T 2207/10016* (2013.01); *G06T 2207/30201* (2013.01)

(58) Field of Classification Search
CPC ........ H04N 19/29; H04N 19/17; H04N 19/30; H04N 19/85; H04N 19/70; H04N 19/27; G06N 3/0454; G06T 3/40; G06T 7/62; G06T 2207/10016; G06T 2207/30201; G06T 2207/20084; G06T 7/73; G06V 40/161
See application file for complete search history.

(56) References Cited

U.S. PATENT DOCUMENTS

| | | |
|---|---|---|
| 2015/0363634 A1 | 12/2015 | Yin et al. |
| 2019/0043266 A1 | 2/2019 | Venshtain et al. |
| (Continued) | | |

OTHER PUBLICATIONS

International Search Report dated Jan. 14, 2022 in International Application No. PCT/US2021/053091.

(Continued)

*Primary Examiner* — Richard T Torrente
(74) *Attorney, Agent, or Firm* — Sughrue Mion, PLLC

(57) ABSTRACT

There is included a method and apparatus comprising computer code configured to cause a processor or processors to perform obtaining video data, detecting at least one face from at least one frame of the video data, determining a set of facial landmark features of the at least one face from the at least one frame of the video data, and coding the video data at least partly by a neural network based on the determined set of facial landmark features.

8 Claims, 14 Drawing Sheets

(56) References Cited

U.S. PATENT DOCUMENTS

| | | | | |
|---|---|---|---|---|
| 2019/0377409 | A1* | 12/2019 | Lemley | G06N 3/08 |
| 2020/0311870 | A1* | 10/2020 | Jung | G06N 3/08 |
| 2022/0156981 | A1* | 5/2022 | Oquab | H04N 7/147 |
| 2022/0207875 | A1* | 6/2022 | Kopparapu | G06V 10/774 |

OTHER PUBLICATIONS

Written Opinion of the International Searching Authority dated Jan. 14, 2022 in International Application No. PCT/US2021/053091.
Oquab et al., "Low Bandwidth Video-Chat Compression using Deep Generative Models", 2020, https://arxiv.org/abs/2012.00328 (11 pages total).

* cited by examiner

901

900

FRAMEWORK FOR VIDEO CONFERENCING BASED ON FACE RESTORATION

CROSS REFERENCE TO RELATED APPLICATION

The present application claims priority to provisional application U.S. 63/134,522 filed on Jan. 6, 2021 which is hereby expressly incorporated by reference, in its entirety, into the present application.

BACKGROUND

1. Field

This disclosure relates to video conferencing involving face restoration (or face hallucination) that may recover realistic details from a real low-quality (LQ) face to a high-quality (HW) one based on landmark features.

2. Description of Related Art

The international standardization organizations ISO/IEC/IEEE are actively searching for AI-based video coding technologies, especially focusing on technologies based on Deep Neural Networks (DNNs). Various AhGs have been formed to investigate Neural Network Compression (NNR), Video Coding for Machine (VCM), Neural Network-based Video Coding (NNVC), etc. The Chinese AITISA and AVS also established corresponding expert groups to study standardization of similar technologies.

Video conferencing has become increasingly important recently, which usually requires low-bandwidth transmission to support joint conferencing of multiple end users. Compared with general video compression tasks, videos in a conferencing scenario mostly have similar content, i.e., one or a few talking person who are the main subjects of the video and take a major portion of the entire scene. The unconstrained backgrounds can be arbitrarily complex, indoor or outdoor, but are less important. Recently, Nvidia's Maxine video conference platform proposed an AI-based framework based on face re-enactment technologies. 2D or 3D facial landmark (such as any one or more of a nose, chin, eyes, proportions, locations, wrinkles, ears, geometries, etc., and or data thereof) ("facial landmark(s)" and "facial landmark feature(s)" may be considered interchangeable terms herein) are extracted from DNNs to capture the pose and emotion information of the human face. Such features together with a high quality features computed at a low frequency to capture the shape and texture of the face are sent to the decoder side, where high quality faces are reconstructed at the decoder side by transferring the shape and texture according to the pose and expression information from each recovered frame. This framework largely reduced the transmission bit consumption since for most frames, instead of transmitting the original pixels, only pose and expression related landmark features are transmitted. However, the re-enactment-based framework cannot guarantee the fidelity to the original face appearance and can result in dramatic artifacts in many cases. For example, it is generally very sensitive to occlusion, large motion, etc. and cannot be robustly used in practical video conferencing products.

As such, there are further technical deficiencies including lack of compressibility, accuracy, and otherwise unnecessary discarding of information related to neural networks.

SUMMARY

According to exemplary embodiments, there is included a method and apparatus comprising memory configured to store computer program code and a processor or processors configured to access the computer program code and operate as instructed by the computer program code. The computer program code includes obtaining code configured to cause the at least one processor to obtain, detecting code configured to cause the at least one processor to detect at least one face from at least one frame of the video data, determining code configured to cause the at least one processor to determine a set of facial landmarks of the at least one face from the at least one frame of the video data, and coding code configured to cause the at least one processor to code the video data at least partly by a neural network based on the determined set of facial landmarks.

According to exemplary embodiments, the video data comprises an encoded bitstream of the video data, and determining the set of facial landmarks comprises up-sampling at least one down-sampled sequence obtained by decompressing the encoded bitstream.

According to exemplary embodiments, the computer program code further include further determining code configured to cause the at least one processor to determine an extended face area (EFA) which comprises a boundary area extended from an area of the detected at least one face from the at least one frame of the video data, and determine a set of EFA features from the EFA, and further coding code configured to cause the at least one processor to code the video data at least partly by the neural network based on the determined set of facial landmarks.

According to exemplary embodiments, determining the EFA and determining the set of EFA features comprise up-sampling the at least one down-sampled sequence obtained by decompressing the encoded bitstream.

According to exemplary embodiments, determining the EFA and determining the set of EFA features further comprise reconstructing the EFA features each respective to ones of the facial landmarks of the set of facial landmarks by a generative adversarial network.

According to exemplary embodiments, coding the video data at least partly by a neural network based on the determined set of facial landmarks further comprises coding the video data at least partly by the neural network based on the determined set of facial landmarks by aggregating the set of facial landmarks, the reconstructed EFA features, and the up-sampled sequence from up-sampling the at least one down-sampled sequence.

According to exemplary embodiments, the at least one face from the at least one frame of the video data is determined to be a largest face among a plurality of faces in the at least one frame of the video data.

According to exemplary embodiments, the determining code is further configured to cause the processor to determine a plurality of sets of facial landmarks, other than the set of facial landmarks of the at least one face from the at least one frame of the video data, respect to each of the plurality of faces in the at least one frame of the video data, and wherein the coding code is further configured to cause the processor to code the video data at least partly by the neural network based on the determined set of facial landmarks and the determined plurality of sets of facial landmarks.

BRIEF DESCRIPTION OF THE DRAWINGS

Further features, nature, and various advantages of the disclosed subject matter will be more apparent from the following detailed description and the accompanying drawings in which.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
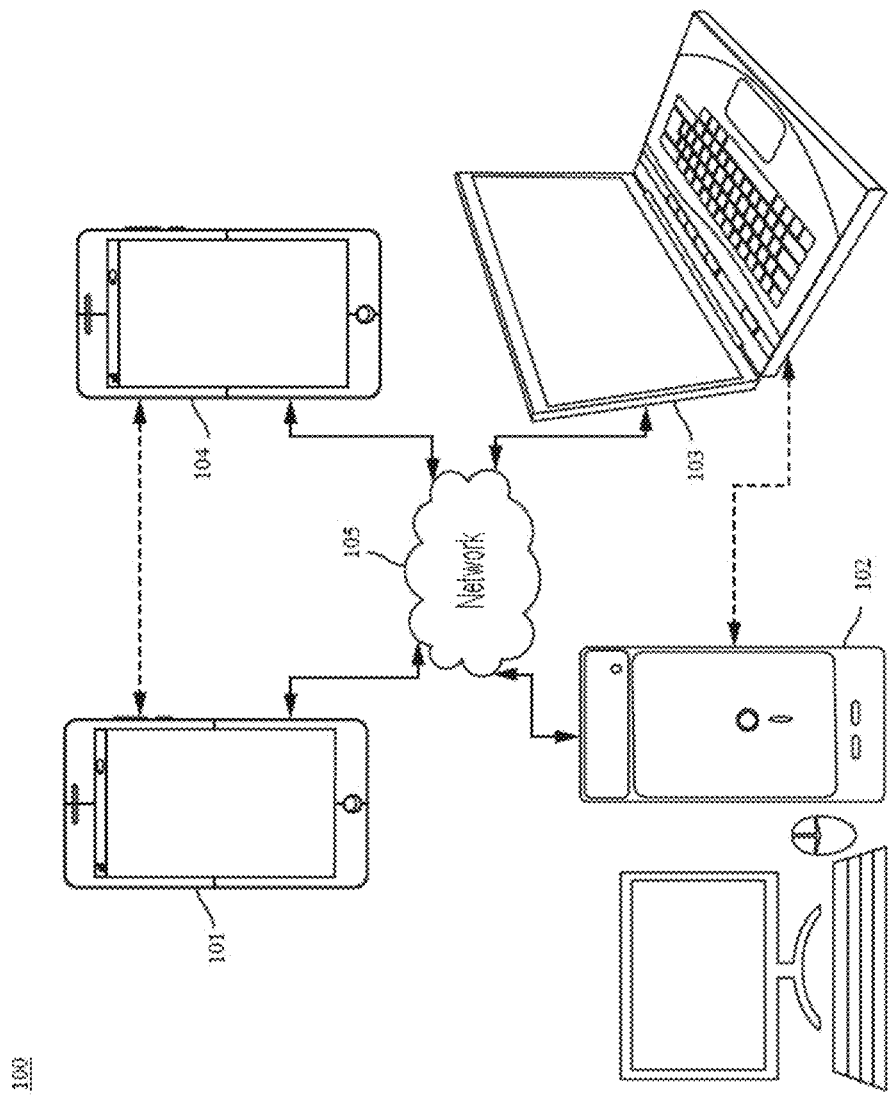
FIG. 1 is a simplified illustration of a schematic diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
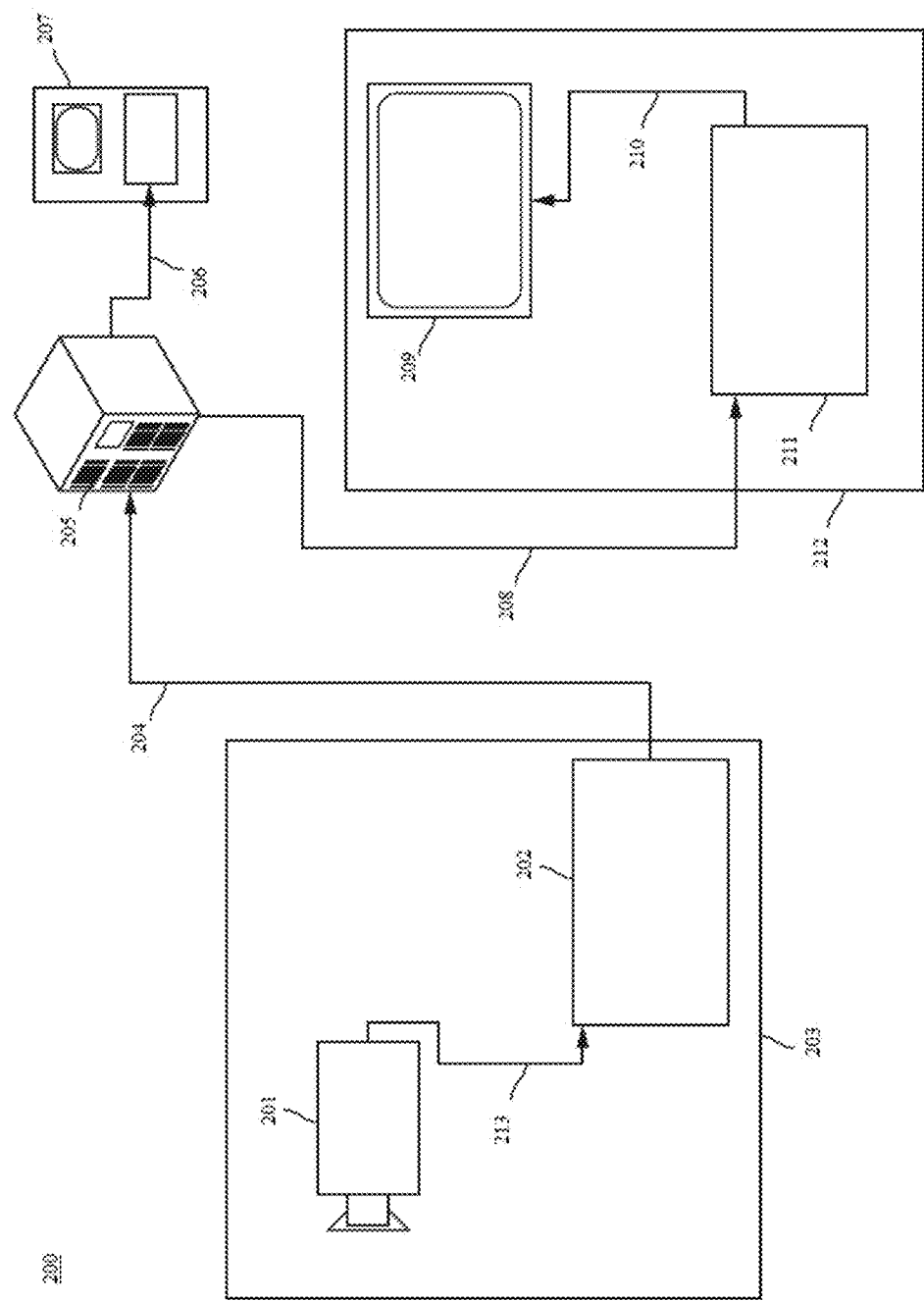
FIG. 2 is a simplified illustration of a schematic diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
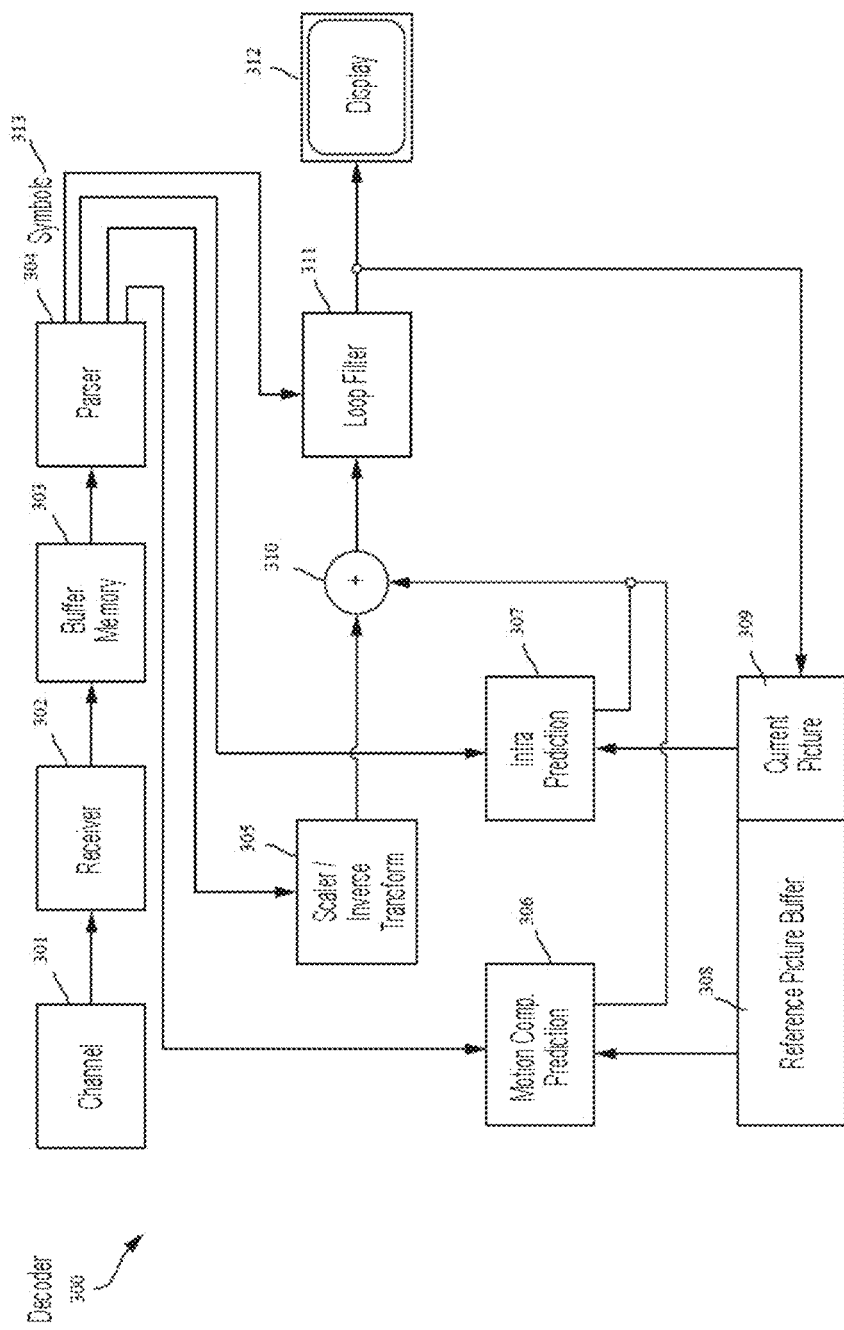
FIG. 3 is a simplified illustration of a schematic diagram in accordance with embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
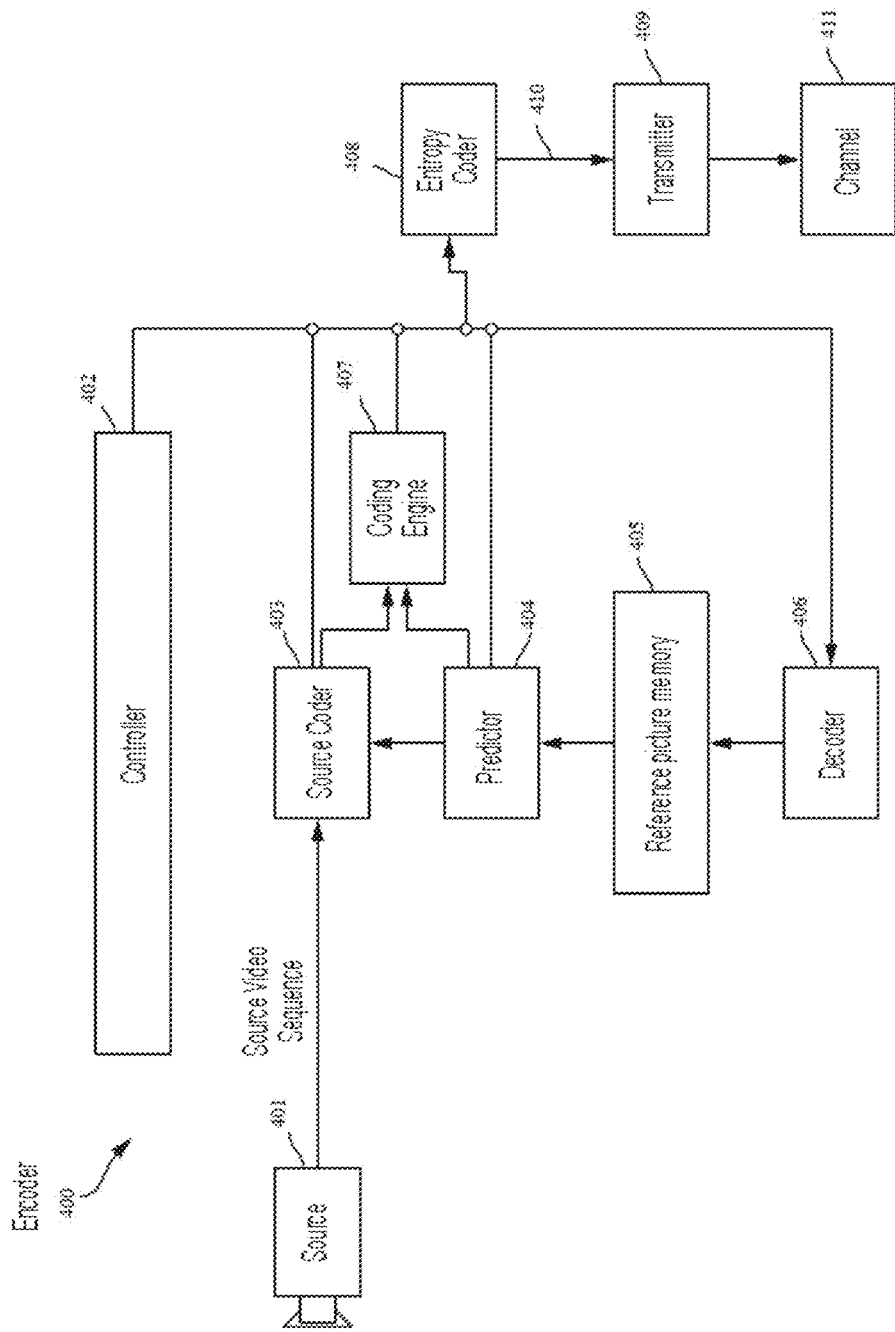
FIG. 4 is a simplified illustration of a schematic diagram in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
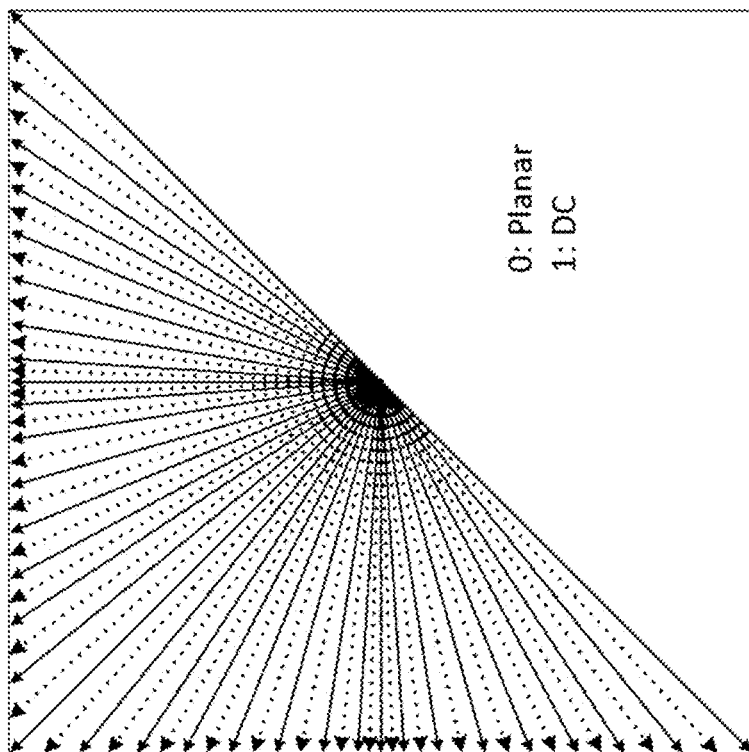
FIG. 5 is a simplified illustration of a diagram in accordance with embodiments.
Figure 5:
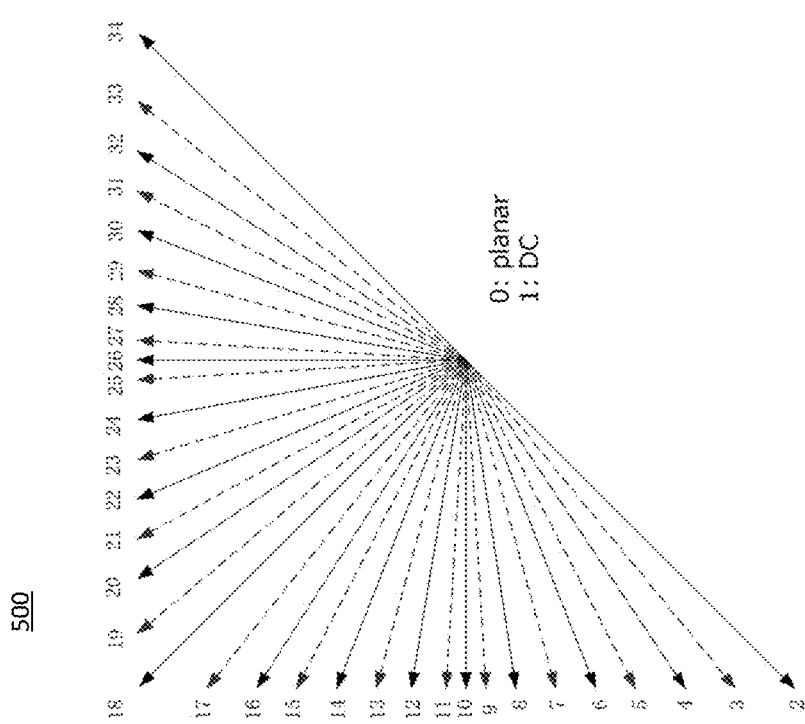

FIG. 5 illustrates intra prediction modes used in HEVC and JEM. To capture the arbitrary edge directions presented in natural video, the number of directional intra modes is extended from 33, as used in HEVC, to 65. The additional directional modes in JEM on top of HEVC are depicted as dotted arrows in FIG. 1(*b*), and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an most probable mode (MPM) list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
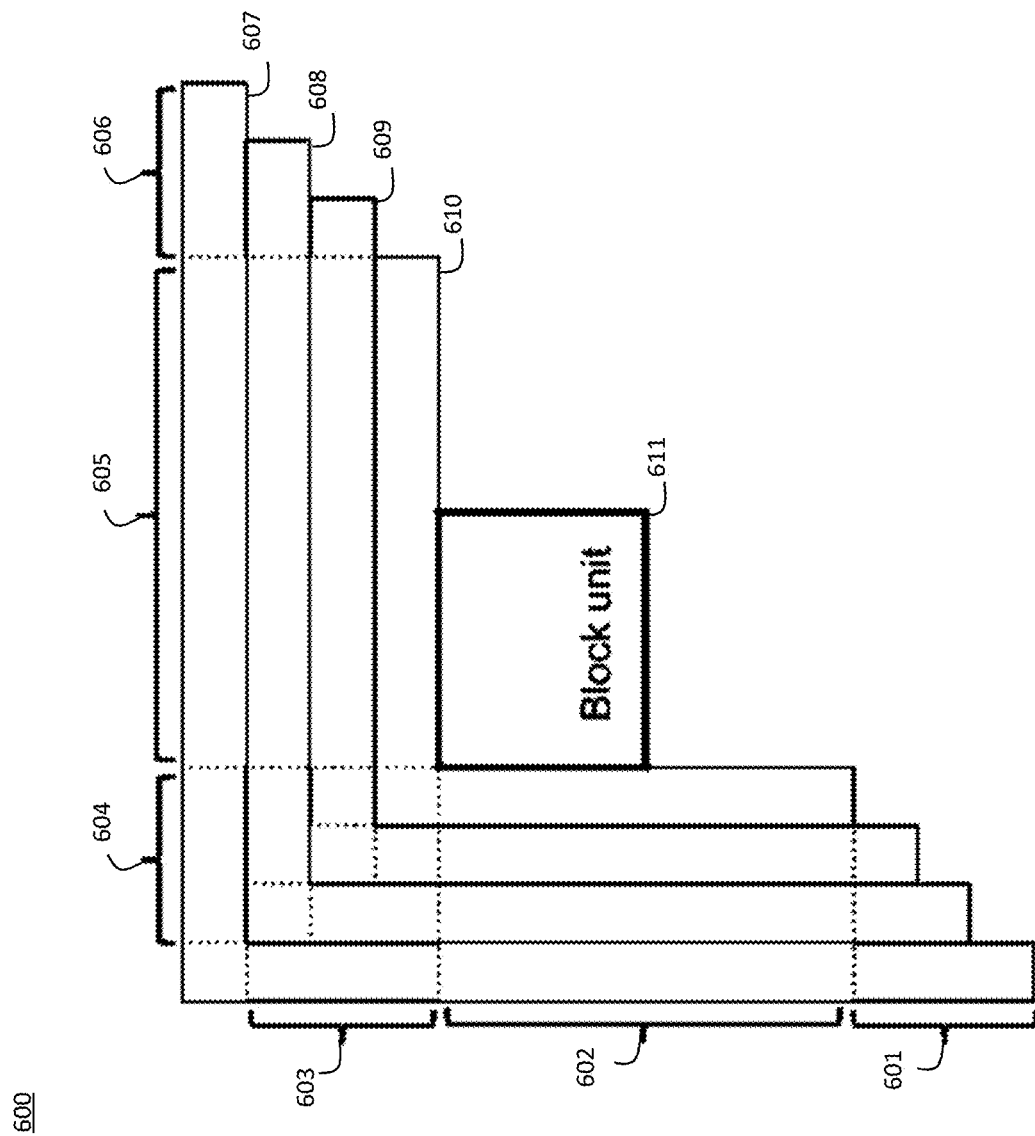
FIG. 6 is a simplified illustration of a diagram in accordance with embodiments.

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 609, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y) is generated from one of the reference samples S1, S2, . . . , and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x,y) is calculated as follows:

$$\text{pred}[x][y]=(wL*R_{-1,y}+wT*R_{x,-1}+wTL*R_{-1,-1}+(64-wL-wT-wTL)*\text{pred}[x][y]+32)>>6 \quad \text{(Eq. 2-1)}$$

where $R_{x,-1}, R_{-1,y}$ represent the unfiltered reference samples located at top and left of current sample (x, y), respectively, and $R_{-1,-1}$ represents the unfiltered reference sample located at the top-left corner of the current block. The weightings are calculated as below, $$wT=32>>((y<<1)>>\text{shift}) \quad \text{(Eq. 2-2)}$$

$$wL=32>>((x<<1)>>\text{shift}) \quad \text{(Eq. 2-3)}$$

$$wTL=-(wL>>4)-(wT>>4) \quad \text{(Eq. 2-4)}$$

$$\text{shift}=(\log 2(\text{width})+\log 2(\text{height})+2)>>2 \quad \text{(Eq. 2-5).}$$

Figure 7:
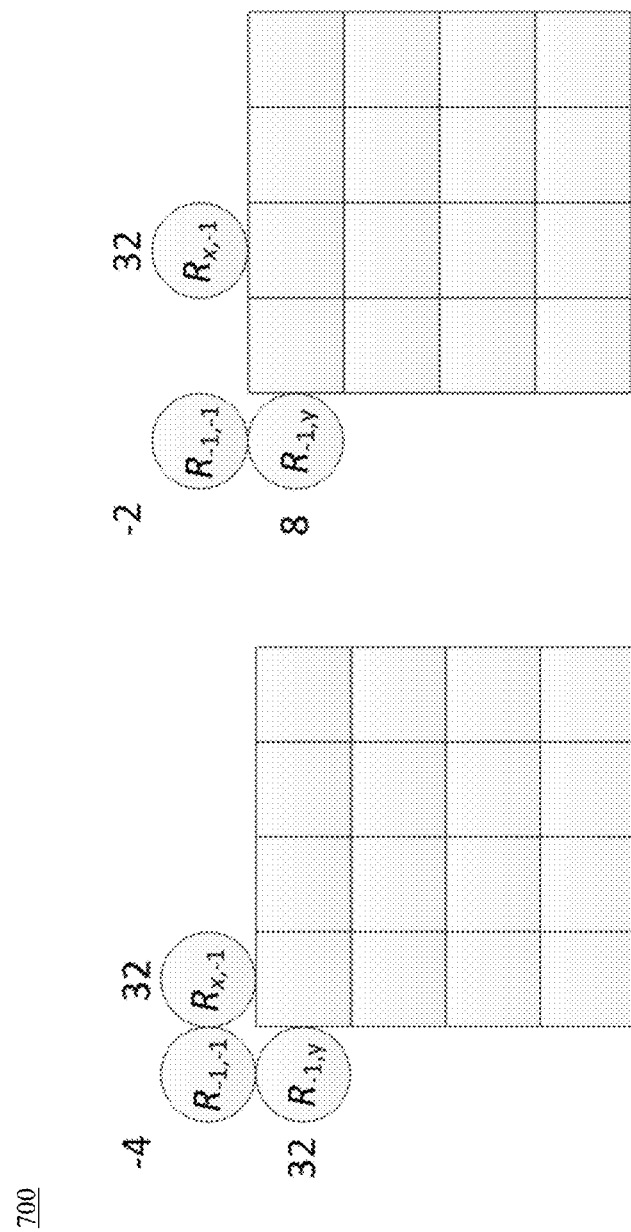
FIG. 7 is a simplified illustration of a diagram in accordance with embodiments.

FIG. 7 illustrates a diagram 700 in which DC mode PDPC weights (wL, wT, wTL) for (0, 0) and (1, 0) positions inside one 4×4 block. If PDPC is applied to DC, planar, horizontal, and vertical intra modes, additional boundary filters are not needed, such as the HEVC DC mode boundary filter or horizontal/vertical mode edge filters. FIG. 7 illustrates the definition of reference samples Rx,−1, R−1,y and R−1,−1 for PDPC applied to the top-right diagonal mode. The prediction sample pred(x', y') is located at (x', y') within the prediction block. The coordinate x of the reference sample Rx,−1 is given by: x=x'+y'+1, and the coordinate y of the reference sample R−1,y is similarly given by: y=x'+y'+1.

Figure 8:
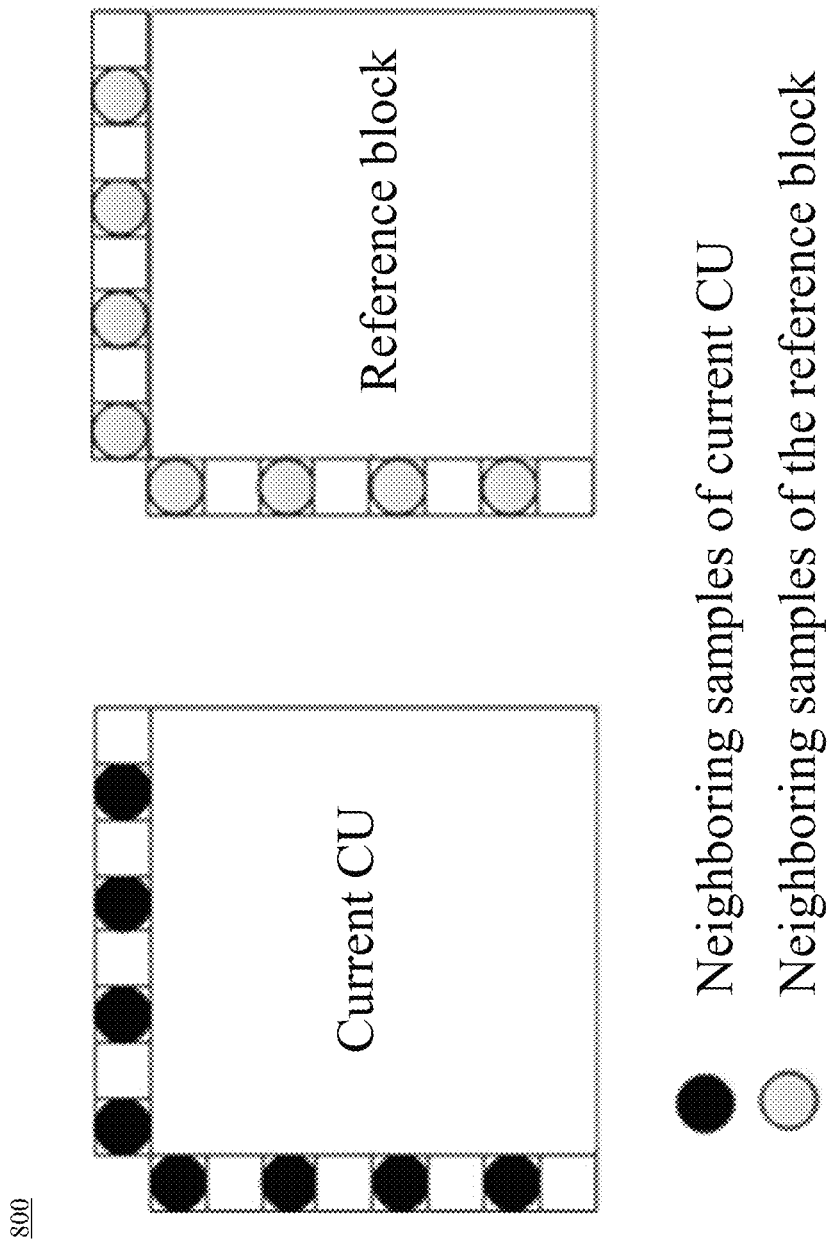
FIG. 8 is a simplified illustration of a diagram in accordance with embodiments.

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

Figure 9B:
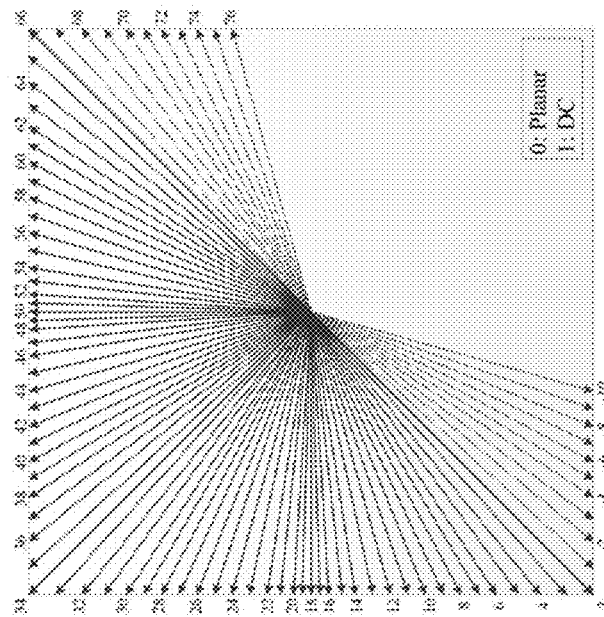
FIG. 9B is a simplified illustration of a diagram in accordance with embodiments.
Figure 9A:
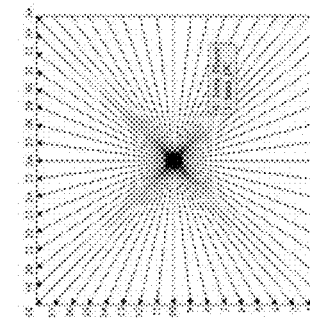
FIG. 9A is a simplified illustration of a diagram in accordance with embodiments.

FIG. 9A illustrates intra prediction modes 900 used in HEVC. In HEVC, there are total 35 intra prediction modes, among which mode 10 is horizontal mode, mode 26 is vertical mode, and mode 2, mode 18 and mode 34 are diagonal modes. The intra prediction modes are signaled by three most probable modes (MPMs) and 32 remaining modes.

FIG. 9B illustrates, in embodiments of VVC, there are total 87 intra prediction modes where mode 18 is horizontal mode, mode 50 is vertical mode, and mode 2, mode 34 and mode 66 are diagonal modes. Modes −1~−10 and Modes 67~76 are called Wide-Angle Intra Prediction (WAIP) modes.

The prediction sample pred(x,y) located at position (x, y) is predicted using an intra prediction mode (DC, planar, angular) and a linear combination of reference samples according to the PDPC expression:

$$\text{pred}(x,y)=(wL\times R_{-1,y}+wT\times Rx,-1-wTL\times R_{-1,-1}+(64-wL-wT+wTL)\,\text{pred}(x,y)+32)>>6$$

where Rx,−1, R−1,y represent the reference samples located at the top and left of current sample (x, y), respectively, and R−1,−1 represents the reference sample located at the top-left corner of the current block.

For the DC mode the weights are calculated as follows for a block with dimensions width and height:

$$wT=32>>((y<<1)>>n\text{Scale}), wL=32>>((x<<1)>>n\text{Scale}), wTL=(wL>>4)+(wT>>4),$$

with nScale=(log 2(width)−2+log 2(height)−2+2)>>2, where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor.

For planar mode wTL=0, while for horizontal mode wTL=wT and for vertical mode wTL=wL. The PDPC weights can be calculated with adds and shifts only. The value of pred(x,y) can be computed in a single step using Eq. 1.

Herein the proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. According to embodiments, the term block may be interpreted as a prediction block, a coding block, or a coding unit, i.e. CU.

Figure 10:
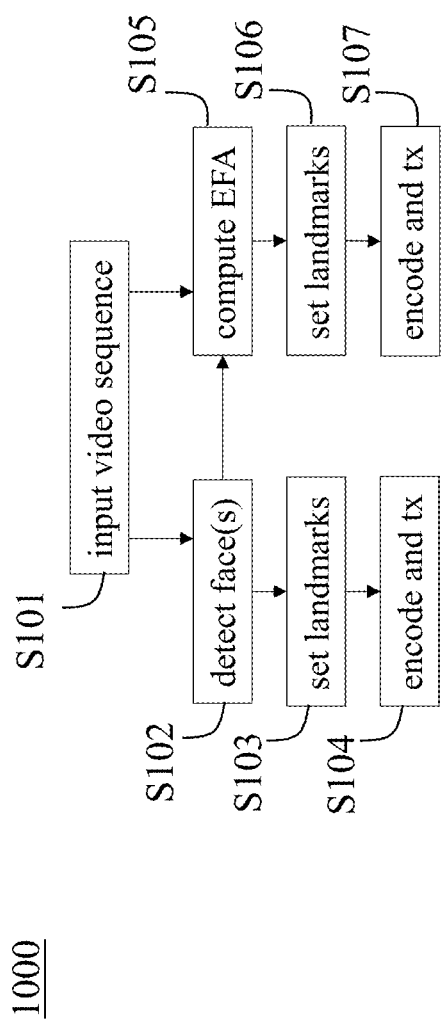
FIG. 10 is a simplified illustration of a flow chart in accordance with embodiments.

FIG. 10 illustrates an exemplary flowchart 1000 and will be described with further reference to FIG. 12 which illustrates a workflow 1200 of an exemplary framework according to exemplary embodiments. The workflow 1200 includes modules such as a face detection and facial landmark extraction module 122, an spatial-temporally (ST) down sample module 123, a landmark feature compression and transmission module 126, an extended face area (EFA) feature compression and transmission module 127, a facial detail reconstruction module 130, an EFA reconstruction module 131, a video compression and transmission module 135, an ST up sample module 137, and a fusion module 139, and the workflow 1200 also includes various data 121, 124, 125, 128, 129, 132, 133, 134, 136, 138, and 140.

As S101, given an input video sequence X=$x_1, x_2, \ldots$, such as data 121, a Face Detection & Facial Landmark Extraction module 122 first, at S102 determines one or a plurality of valid faces from each video frame $x_i$. In one embodiment, only the most prominent (e.g., largest) face are detected, and in another embodiment, all faces in the frame satisfying a condition (e.g., with a large enough size exceeding a threshold) are detected. At S103, for the j-th face in $x_i$, a set of facial landmarks are determined and a set of facial landmark features $f_{l,i,j}$, are computed correspondingly, which will be used by the decoder for restoring the j-th face in $x_i$. At S103, all facial landmark features of all faces are put together as $F_{l,i}=f_{l,i,1}, f_{l,i,2}, \ldots$, data 124, which is encoded and transmitted by a Landmark Feature Compression & Transmission module 126. At S105, at the same time, for the j-th face in $x_i$, an Extended Face Area (EFA) can be computed by extending the bounding area (boundary as a rectangle, eclipse, or fine-grained segmentation boundary) of the original detected face to include additional hair, body parts, or even backgrounds. At S106 and S107, a set of EFA features $f_{b,i,j}$ can be computed correspondingly, which will be used by the decoder for restoring the EFA of the j-th face in $x_i$. At S107, all EFA features of all faces are put together as $F_{b,i}=f_{b,i,1}, f_{b,i,2}, \ldots$, data 125, which is encoded and transmitted by an EFA Compression & Transmission module 127.

According to exemplary embodiments, the Face Detection & Facial Landmark Extraction module 122 can use any face detector to locate face areas in each video frame $x_i$, such as any object detection DNN by treating human faces as a special object category or other DNN architectures specially designed for locating human faces. The Face Detection & Facial Landmark Extraction module 122 can also use any facial landmark detector to locate a pre-determined set of facial landmarks for each detected face (e.g., landmarks around left/right eyes, nose, mouse, etc.). In some embodiment, one multi-task DNN can be used to locate faces and the associated landmarks at the same time. The facial landmark feature $f_{l,i,j}$ can be the intermediate latent representation computed by the facial landmark detector, which is directly used to locate the landmarks of the j-th face. Additional DNNs can also be applied to further process the intermediate latent representation and compute the facial landmark feature $f_{l,i,j}$. For example, we can aggregate information from feature maps corresponding to individual landmarks around a facial part, e.g., right eye, into a joint feature about that facial part. Similarity, the EFA feature $f_{b,i,j}$ can be the intermediate latent representation computed by the face detector corresponding to the j-th face. Additional DNNs can also be used to compute $f_{b,i,j}$ based on the intermediate latent representation, e.g., by emphasizing the background region other than the actual facial area. Various exemplary embodiments may not be restricted as to the methods or DNN architectures of the face detector, facial landmark detector, facial landmark feature extractor, or the EFA feature extractor features.

According to exemplary embodiments, the Landmark Feature Compression & Transmission module 126 can use various methods to efficiently compress the facial landmark features. In the preferred embodiment, a codebook-based mechanism is used where for each facial part (e.g., the right eye) a codebook can be generated. Then for a specific facial part of a specific face (e.g., right eye of the current face in the current frame), its facial landmark feature can be represented by a weighted combination of codewords in this codebook. In such a case, the codebook is stored at the decoder side, and there may only be a need to transfer the weight coefficients for the codewords to the decoder side to recover the facial landmark feature. Similarly, the EFA Compression & Transmission module 127 can also use various methods to compress the EFA features. In a preferred embodiment, an EFA codebook is also used where a specific EFA feature is represented by weighted combination of the EFA codewords, and there may then be only a need to transfer weight coefficients for the codewords to recover the EFA feature.

On the other hand, the input video sequence $X=x_1, x_2, \ldots$, data 121, is Spatial-Temporally (ST) down-sampled into $X'=x'_1, x'_2, \ldots$ by an ST Down Sample module 123. Compared with X, X' can be down-sampled spatially, temporally, or both spatially and temporally. When X is spatially down-sampled, each $x_i$ and $x'_i$ have the same time stamp, and $x'_i$ is computed from $x_i$ with a reduced resolution, e.g., by traditional or DNN-based interpolation. When X is temporally down-sampled, each $x'_i$ corresponds to an $x_{ki}$ at a different time stamp, where k is the down-sample frequency (one frame is sampled from every k frames of X to generate X'). When X is both spatially and temporally down-sampled, each $x'_i$ is computed from an $x_{ki}$ at a different time stamp with a reduced resolution, e.g., by traditional or DNN-based interpolation. Then the down-sampled sequence $X'=x'_1, x'_2, \ldots$, data 134, can be treated as an LQ version of the original HQ input $X=x_1, x_2, \ldots$. $X'=x'_1, x'_2, \ldots$ can then be encoded and transmitted by a Video Compression & Transmission module 135. Any video compression framework can be used by the Video Compression & Transmission module 135, such as HEVC, VVC, NNVC, or end-to-end video coding according to exemplary embodiments.

Figure 11:
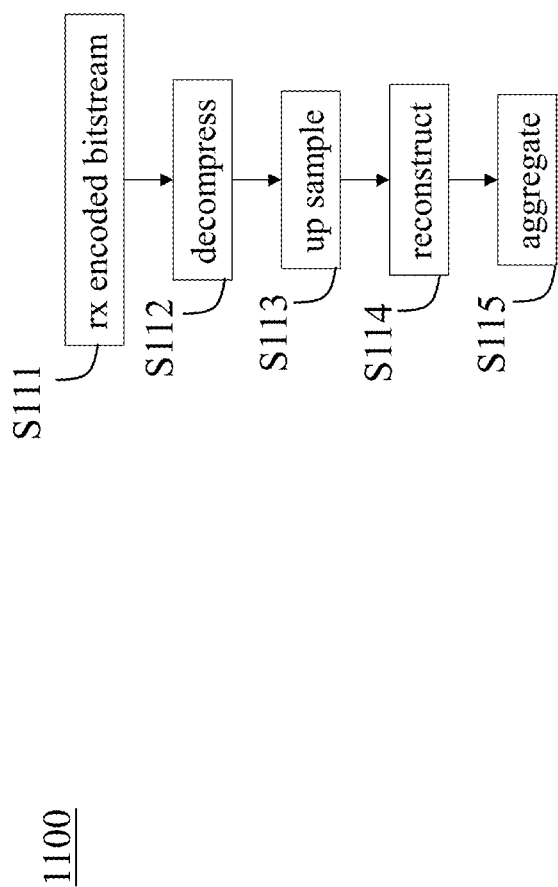
FIG. 11 is a simplified illustration of a flow chart in accordance with embodiments.
Figure 12:
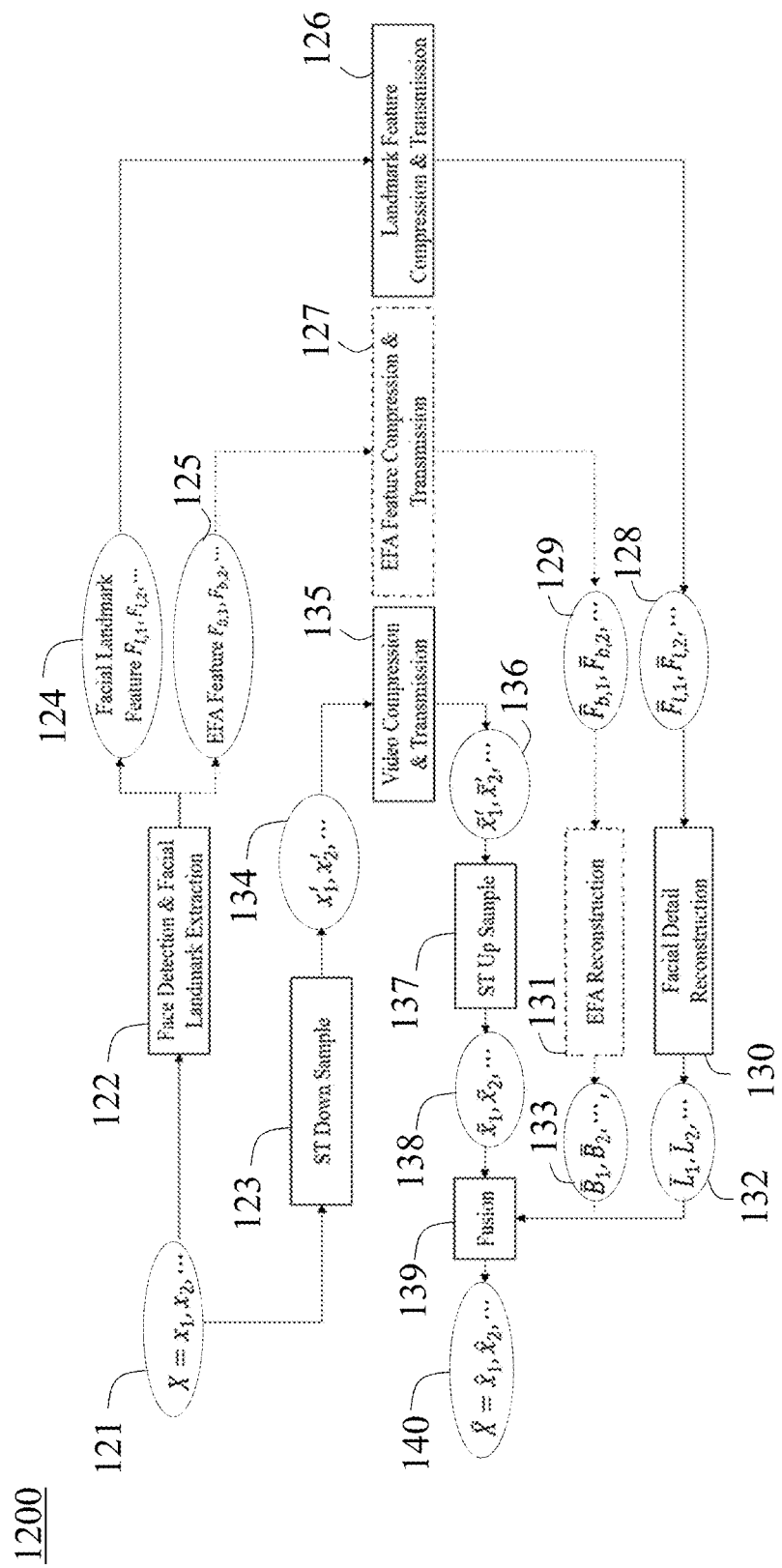
FIG. 12 is a simplified illustration of a block diagram in accordance with embodiments.

On the decoder side, such as described for example with respect to the flowchart 1100 of FIG. 11 and various modules of FIG. 12, received encoded bitstreams, at S111, are first decompressed, at S112, to obtain the decoded down-sampled sequence $\overline{X}=\overline{x}'_1, \overline{x}'_2, \ldots$, data 136, the decoded EFA features $\overline{F}_{b,1}, \overline{F}_{b,2}, \ldots$, data 129, and the decoded facial landmark features $\overline{F}_{l,1}, \overline{F}_{l,2}, \ldots$, data 128. Each decoded frame $\overline{x}'_i$ corresponds to the down-sampled $x'_i$. Each decoded EFA feature $\overline{F}_{b,i}$ corresponds to the EFA feature $F_{b,i}$. Each decoded landmark feature $\overline{F}_{l,i}$ corresponds to the landmark feature $F_{l,i}$. At S113, the decoded down-sampled sequence $\overline{X}=\overline{x}'_1, \overline{x}'_2, \ldots$ is passed through an ST Up Sample module 137 to generate an up-sampled sequence $\overline{X}=\overline{x}_1, \overline{x}_2, \ldots$, data 138. Corresponding to the encoder size, this ST Up Sample module performs spatial, temporal, or both spatial and temporal up-sampling as an inverse operation of the down-sampling process in the ST Down Sample module 123. When the spatial down-sampling is used on the encoder side, the spatial up-sampling is used here where each $\overline{x}'_i$ is up-sampled into $\overline{x}_i$ at the same time stamp, e.g., by traditional interpolation or DNN-based super-resolution methods, and $\overline{x}_i$ will have the same resolution with $x_i$. When temporal down-sampling is used on the encoder side, the temporal up-sampling is used here where each $\overline{x}_{ki}$ is $\overline{x}'_i$ and the additional (k−1) frames between $\overline{x}_{ki}$ and $\overline{x}_{(k+1)i}$ are computed, e.g., by using traditional motion interpolation or DNN-based frame synthesis methods based on $\overline{x}_{ki}$ and $\overline{x}_{(k+1)i}$. When both spatial and temporal down-sampling is used on the encoder side, the spatial and temporal up-sampling is used here where each $\overline{x}_{ki}$ is computed from $\overline{x}'_i$ by spatially up-sampling $\overline{x}'_i$ using traditional interpolation or DNN-based super-resolution methods, and the additional frames between $\overline{x}_{ki}$ and $\overline{x}_{(k+1)i}$ are further generated by using traditional motion interpolation or DNN-based frame synthesis methods based on $\overline{x}_{ki}$ and $\overline{x}_{(k+1)i}$.

At S114, the decoded EFA features $\overline{F}_{b,1}, \overline{F}_{b,2}, \ldots$ are passed through an EFA Reconstruction module 131 to compute a sequence of reconstructed EFAs $\overline{B}_1, \overline{B}_2, \ldots$, data 133, Each $\bar{B}_i=\bar{b}_{i,1}, \bar{b}_{i,2}, \ldots$ contains a set of EFAs, $\bar{b}_{i,j}$ being the EFA of the j-th face in frame $\bar{x}_i$. The decoded landmark features $\bar{F}_{l,1}, \bar{F}_{l,2}, \ldots$, data 128, are passed through a Facial Detail Reconstruction module 130 to compute a sequence of recovered facial details $\bar{L}_1, \bar{L}_2, \ldots$, data 132. Each $\bar{L}_i=\bar{l}_{i,1}, \bar{l}_{i,2}, \ldots$ contains a set of facial detail representations, $\bar{l}_{i,j}$ corresponding to the j-th face in frame $\bar{x}_i$. In the preferred embodiment, the EFA Reconstruction module 131 is a DNN composed by stacks of residual blocks and convolution layers. The Facial Detail Reconstruction module 130 is a conditional generative adversarial network (GAN), conditioned on the landmark features corresponding to different facial parts. To compute $\bar{B}_i$ for time stamp i, the EFA Reconstruction module 131 may use only the decoded EFA feature $\bar{F}_{b,i}$ of this time stamp or use the EFAs $\bar{F}_{b,i-n}, \ldots, \bar{F}_{b,i+m}$ (n, m being arbitrary positive integers) of a few neighbouring time stamps. Similarly, to compute $\bar{L}_i$ for time stamp i, the Facial Detail Reconstruction module 130 may use only the decoded landmark feature $\bar{F}_{l,i}$ of this time stamp or use the EFAs $\bar{F}_{l,i-n}, \ldots, \bar{F}_{l,i+m}$ of a few neighbouring time stamps. After that, at S115, the recovered facial details $\bar{L}_1, \bar{L}_2, \ldots$, the reconstructed EFAs $\bar{B}_1, \bar{B}_2, \ldots$, and the up-sampled sequence $\bar{X}=\bar{x}_1, \bar{x}_2, \ldots$ are aggregated together by a Fusion module 139 to generate the final reconstructed video sequence $\hat{X}=\hat{x}_1, \hat{x}_2, \ldots$, data 140. The Fusion module can be a small DNN, where for generating $\hat{x}_i$ at time stamp i, the Fusion module can use only $\bar{L}_i, \bar{B}_i,$ and $\bar{x}_i$ from the same time stamp, or use $\bar{L}_{i-n}, \ldots, \bar{L}_{i+m}, \bar{B}_{i-n}, \ldots, \bar{B}_{i+m},$ and use $\bar{x}_{i-n}, \ldots, \bar{x}_{i+1}$ from a few neighbouring time stamps. Exemplary embodiments may not include any restrictions on the DNN architectures of the Facial Detail Reconstruction module 130, the EFA Reconstruction module 131, and/or the Fusion module 139.

A purpose of using the EFA features is to improve the reconstruction quality of the extended facial area (such as hair, body parts, etc.). In some embodiments, the process related to EFA can be optional depending on tradeoff between the reconstruction quality and the computation and transmission costs. Therefore, in FIG. 12, such optional processes are marked by dotted lines such as between elements 125, 127, 129, 131, and 133.

Also, according to exemplary embodiments, there are several components in the proposed framework that needs to be trained, and such training will be described with respect to FIG. 13 which illustrates a workflow 1300 of an exemplary training process according to exemplary embodiments. The workflow 1300 includes modules such as a face detection and facial landmark extraction module 223, an ST down sample module 222, a landmark feature noise modeling module 226, an EFA feature noise modeling module 227, a facial detail reconstruction module 230, an EFA reconstruction module 231, a video noise modelling module 235, an ST up sample module 237, a fusion module, a compute adversarial loss module 241, a compute reconstruction loss module 242, a compute perceptual loss module 243, and the workflow 1300 also includes various data 221, 224, 225, 229, 228, 232, 233, 236, 238, and 240.

According to exemplary embodiments, there are several components in the proposed framework that needs to be trained before deployment, including the face detector, facial landmark detector, facial landmark feature extractor, and the EFA feature extractor in the Face Detection & Facial Landmark Extraction module 122, the EFA Reconstruction module 131, and the Facial Detail Reconstruction module 130. Optionally, the ST Down Sample 123 module and the ST Up Sample module 137 also need to be pre-trained if learning-based down-sampling or up-sampling methods are used. In one preferred embodiment, all these components use DNN-based methods, and the weight parameters of these DNNs need to be trained. In other embodiments, some of these components can use traditional learning-based methods, such as the traditional facial landmark detector, and the corresponding model parameters also need to be trained. Each learning-based component, DNN-based or traditional, are first individually pre-trained, and then jointly tuned through the training process described in this disclosure.

Figure 13:
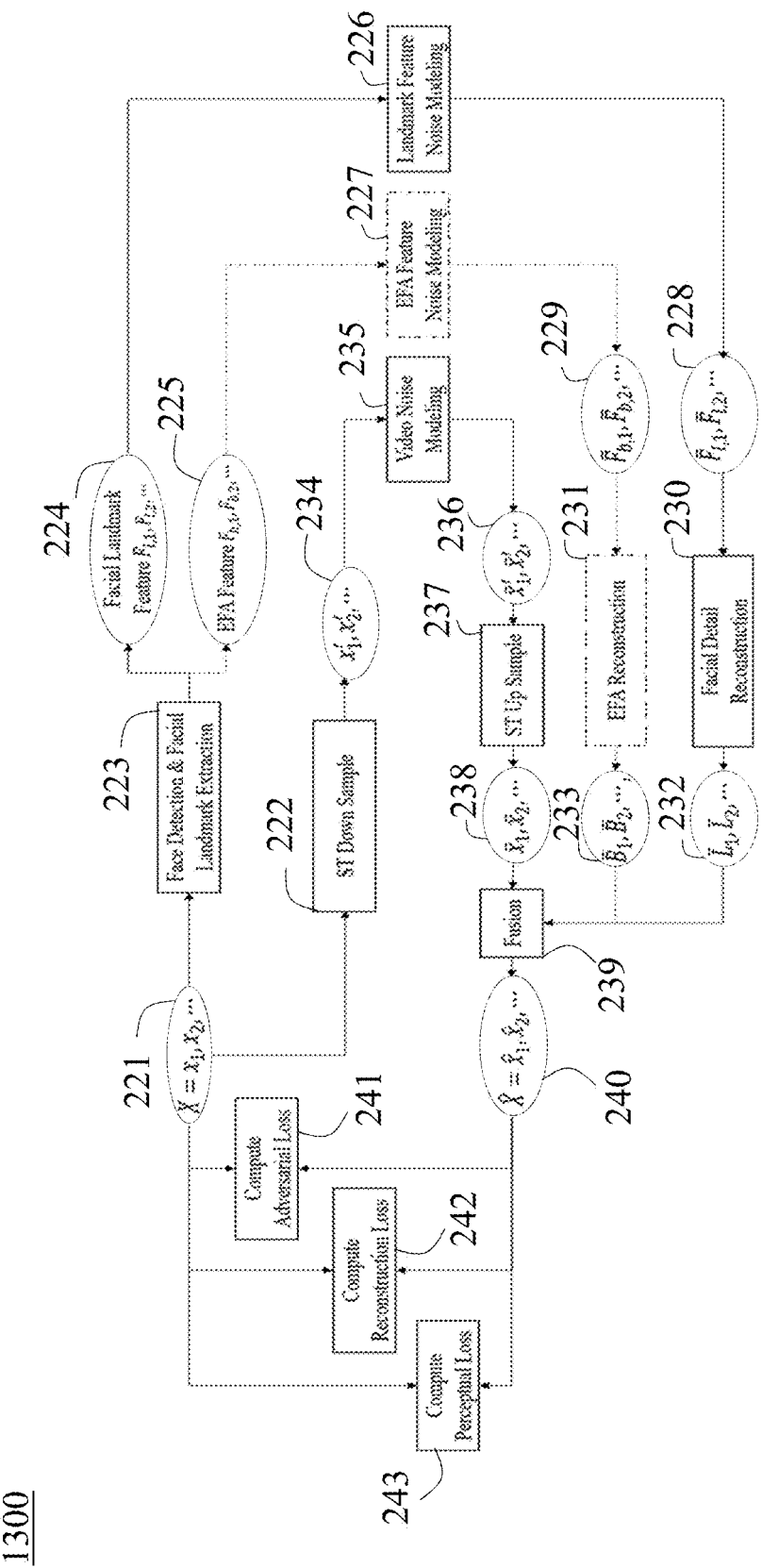
FIG. 13 is a simplified illustration of a block diagram in accordance with embodiments.

For example, FIG. 13 gives the overall workflow 1300 of a preferred embodiment of the training process. For training, the actual Video Compression & Transmission module 135 by a Video Noise Modeling module 235. This is because the actual video compression includes non-differentiable process such as quantization. The Video Noise Modeling module 235 adds random noises to the down-sampled sequence $X'=x'_1, x'_2, \ldots$ to generate the decoded down-sampled sequence $\bar{X}=\bar{x}'_1, \bar{x}'_2, \ldots$ in the training process, mimicking the true data distribution of the decoded down-sampled sequence in the final test stage. Therefore, the noise model used by the Video Noise Modeling module 235 usually depends on the actual video compression method used in practice. Similarly, we replace the EFA Feature Compression & Transmission module 127 by an EFA Feature Noise Modeling module 227, which adds noises to $F_{b,1}, F_{b,2}, \ldots$ to generate the decoded EFA features $\bar{F}_{b,1}, \bar{F}_{b,2}, \ldots$ in the training stage, mimicking the data distribution of the actual decoded EFA features in practice. Also, there is replaced the Landmark Feature Compression & Transmission module 126 by a Landmark Feature Noise Modeling module 226, which adds noises to $F_{l,1}, F_{l,2}, \ldots$ to generate the decoded landmark features $\bar{F}_{l,1}, \bar{F}_{l,2}, \ldots$ in the training stage, mimicking the true distribution of the decoded landmark features in practice. Exemplary embodiments compute the following loss functions for training.

Several types of losses are computed in the training process to learn the learnable components. The distortion loss $D(X, \hat{X})$ can be computed in a Compute Reconstruction Loss module 242 to measure the difference between the original and reconstructed training sequence, e.g., $D(X, \hat{X})=\Sigma_i D(x_i, \hat{x}_i)$ where $D(x_i, \hat{x}_i)$ can be the MAE or SSIM between $x_i$ and $\hat{x}_i$. An importance weight map can also be used to emphasize the distortion of the reconstructed facial area or different parts of the facial area. Also, a perceptual loss $P(X, \hat{X})$ can be computed in a Compute Perceptual Loss module, e.g., $P(X, \hat{X})=\Sigma_i P(x_i, \hat{x}_i)$ where a feature extraction DNN (e.g., the VGG backbone network) computes a feature representation based on $x_i$ and $\hat{x}_i$, respectively. The difference (e.g., MSE) of feature representation computed based on $x_i$ and $\hat{x}_i$ is used as the perceptual loss. An adversarial loss $A(X, \hat{X})$ can be computed by a Compute Adversarial Loss module 241, e.g., e.g., $A(X, \hat{X})=\Sigma_i A(x_i, \hat{x}_i)$, to measure how natural the reconstructed input $\hat{X}$ looks. This is done by feeding either the true x or the reconstructed $\hat{x}_i$ into a discriminator (which is usually a classification DNN like ResNet) to classify whether it is natural or reconstructed, and a classification error (e.g., cross-entropy loss) can be used as $A(x_i, \hat{x}_i)$. The distortion loss $D(X, \hat{X})$, the perceptual loss $P(X, \hat{X})$, and the adversarial loss $A(X, \hat{X})$ can be weighted combined as a joint loss $E(X, \hat{X})$, whose gradient can be computed to update the model parameters through back-propagation:

$$E(X,\hat{X})=D(X,\hat{X})+\alpha P(X,\hat{X})+\beta A(X,\hat{X}) \qquad \text{(Eq. 1)}$$

where $\alpha$ and $\beta$ are hyperparameters balancing the importance of different loss terms.

Note that different components can be updated at different times with different updating frequencies. Sometimes, only some components are updated after deployment periodically or frequently when new training data is available. Sometimes only part of the model parameters are updated after deployment. This disclosure does not put any restrictions on the optimization methods, the frequency of model updates, or the percentage of model parameters to be updated.

As such, exemplary embodiments of any of workflows 1200 and 1300 represent novel frameworks for video compression and transmission in video conferencing based on face restoration with improved coding efficiency by transmitting LQ frames and facial features, flexible and general frameworks for spatially, temporally or spatial-temporally down-sampled frames, flexible and general framework for different DNN architectures, and flexible and general frameworks to accommodate multiple faces with arbitrary backgrounds.

Embodiments further represent a video conferencing framework based on face restoration (or face hallucination) that recovers realistic details from a real low-quality (LQ) face to a high-quality (HQ) one. Instead of relying on error-prone shape and texture transfer as in face re-enactment methods, we recover details of the HQ face based on LQ face and facial landmark features. Exemplary frameworks disclosed herein may guarantee robust quality of the restored faces, which is key for real products. For example, only down-sampled frames and facial features may be transmitted to reduce the transmission cost, and HQ frames may be recovered on the decoder side based on the down-sampled frames and facial features.

The techniques described above, can be implemented as computer software using computer-readable instructions and physically stored in one or more computer-readable media or by a specifically configured one or more hardware processors. For example, FIG. 14 shows a computer system 1400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
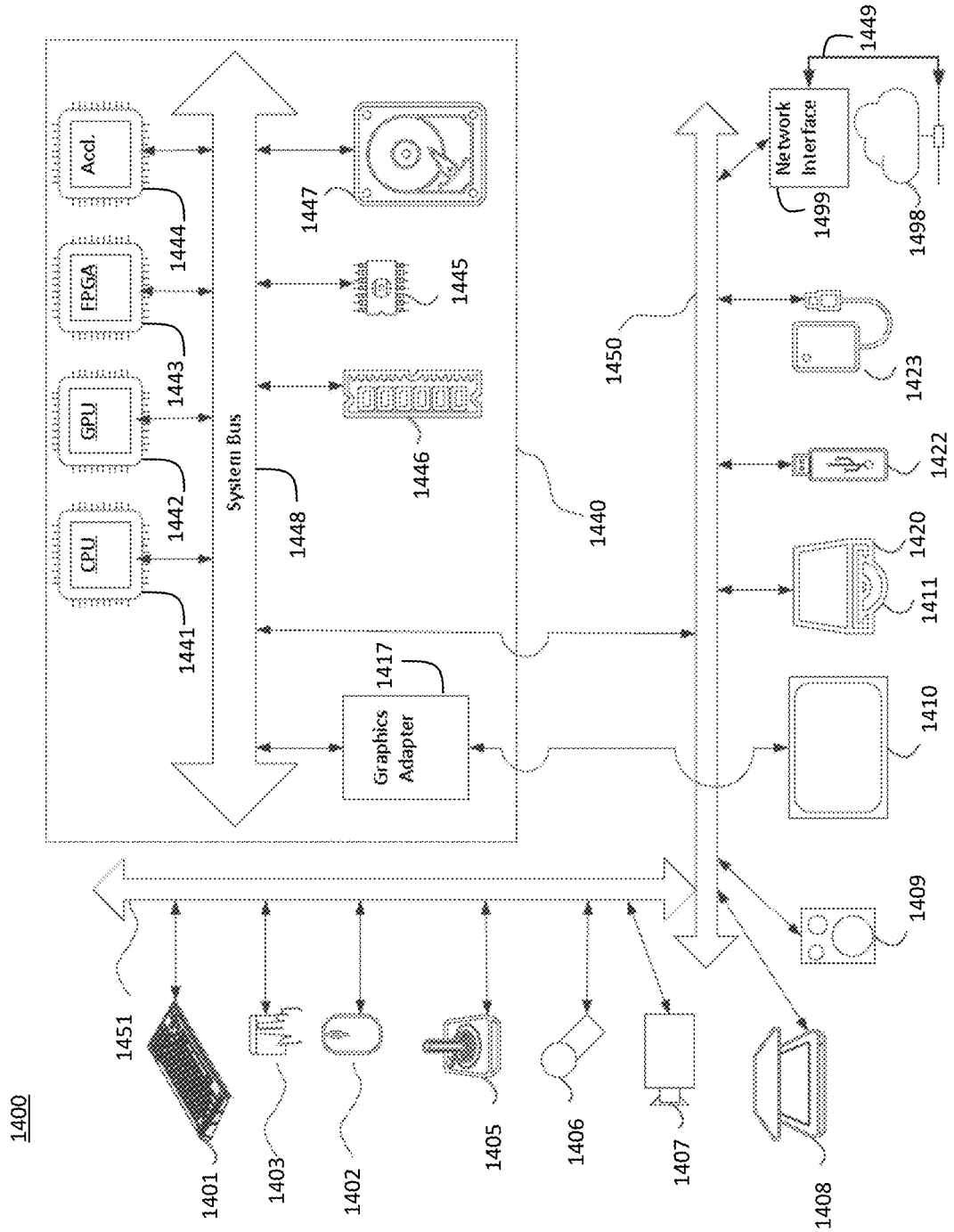
FIG. 14 is a simplified illustration of a schematic diagram in accordance with embodiments.

The components shown in FIG. 14 for computer system 1400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1400.

Computer system 1400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1401, mouse 1402, trackpad 1403, touch screen 1410, joystick 1405, microphone 1406, scanner 1408, camera 1407.

Computer system 1400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1410, or joystick 1405, but there can also be tactile feedback devices that do not serve as input devices), audio output devices (such as: speakers 1409, headphones (not depicted)), visual output devices (such as screens 1410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1400 can also include human accessible storage devices and their associated media such as optical media including CD/DVD ROM/RW 1420 with CD/DVD 1411 or the like media, thumb-drive 1422, removable hard drive or solid state drive 1423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1400 can also include interface 1499 to one or more communication networks 1498. Networks 1498 can for example be wireless, wireline, optical. Networks 1498 can further be local, wide-area, metropolitan, vehicular and industrial, real-time, delay-tolerant, and so on. Examples of networks 1498 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1498 commonly require external network interface adapters that attached to certain general-purpose data ports or peripheral buses (1450 and 1451) (such as, for example USB ports of the computer system 1400; others are commonly integrated into the core of the computer system 1400 by attachment to a system bus as described below (for example Ethernet interface into a PC computer system or cellular network interface into a smartphone computer system). Using any of these networks 1498, computer system 1400 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1440 of the computer system 1400.

The core 1440 can include one or more Central Processing Units (CPU) 1441, Graphics Processing Units (GPU) 1442, a graphics adapter 1417, specialized programmable processing units in the form of Field Programmable Gate Areas (FPGA) 1443, hardware accelerators for certain tasks 1444, and so forth. These devices, along with Read-only memory (ROM) 1445, Random-access memory 1446, internal mass storage such as internal non-user accessible hard drives, SSDs, and the like 1447, may be connected through a system bus 1448. In some computer systems, the system bus 1448 can be accessible in the form of one or more physical plugs to enable extensions by additional CPUs, GPU, and the like. The peripheral devices can be attached either directly to the core's system bus 1448, or through a peripheral bus 1451. Architectures for a peripheral bus include PCI, USB, and the like.

CPUs 1441, GPUs 1442, FPGAs 1443, and accelerators 1444 can execute certain instructions that, in combination, can make up the aforementioned computer code. That computer code can be stored in ROM 1445 or RAM 1446. Transitional data can be also be stored in RAM 1446, whereas permanent data can be stored for example, in the internal mass storage 1447. Fast storage and retrieval to any of the memory devices can be enabled through the use of cache memory, that can be closely associated with one or more CPU 1441, GPU 1442, mass storage 1447, ROM 1445, RAM 1446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1400, and specifically the core 1440 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1440 that are of non-transitory nature, such as core-internal mass storage 1447 or ROM 1445. The software implementing various embodiments of the present disclosure can be stored in such devices and executed by core 1440. A computer-readable medium can include one or more memory devices or chips, according to particular needs. The software can cause the core 1440 and specifically the processors therein (including CPU, GPU, FPGA, and the like) to execute particular processes or particular parts of particular processes described herein, including defining data structures stored in RAM 1446 and modifying such data structures according to the processes defined by the software. In addition or as an alternative, the computer system can provide functionality as a result of logic hardwired or otherwise embodied in a circuit (for example: accelerator 1444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video coding performed by at least one processor, the method comprising:
   obtaining video data;
   detecting at least one face from at least one frame of the video data;
   determining a set of facial landmark features of the at least one face from the at least one frame of the video data;
   determining an extended face area (EFA) which comprises a boundary area extended from an area of the detected at least one face from the at least one frame of the video data;
   determining a set of EFA features from the EFA; and
   coding the video data at least partly by a neural network based on the determined set of facial landmark features and on aggregating the set of facial landmark features, reconstructed EFA features, and an up-sampled sequence that is up-sampled from at least one down-sampled sequence,
   wherein the video data comprises an encoded bitstream of the video data,
   wherein determining the set of facial landmark features comprises up-sampling the at least one down-sampled sequence obtained by decompressing the encoded bitstream,
   wherein determining the EFA and determining the set of EFA features comprise up-sampling the at least one down-sampled sequence obtained by decompressing the encoded bitstream, and
   wherein determining the EFA and determining the set of EFA features further comprise reconstructing the EFA features, into the reconstructed EFA features, each respective to ones of the facial landmark features of the set of facial landmark features by a generative adversarial network.

2. The method according to claim 1,
   wherein the at least one face from the at least one frame of the video data is determined to be a largest face among a plurality of faces in the at least one frame of the video data.

3. The method according claim 1, further comprising:
   determining a plurality of sets of facial landmark features, other than the set of facial landmark features of the at least one face from the at least one frame of the video data, respect to each of the plurality of faces in the at least one frame of the video data; and
   coding the video data at least partly by the neural network based on the determined set of facial landmark features and the determined plurality of sets of facial landmark features.

4. The method according to claim 1,
   wherein the neural network comprises a deep neural network (DNN).

5. An apparatus for video coding, the apparatus comprising:
   at least one memory configured to store computer program code;

at least one processor configured to execute the computer program code to implement:
  obtaining video data;
  detecting at least one face from at least one frame of the video data;
  determining a set of facial landmark features of the at least one face from the at least one frame of the video data;
  determining an extended face area (EFA) which comprises a boundary area extended from an area of the detected at least one face from the at least one frame of the video data;
  determining a set of EFA features from the EFA; and
  coding the video data at least partly by a neural network based on the determined set of facial landmark features and on aggregating the set of facial landmark features, reconstructed EFA features, and an up-sampled sequence that is up-sampled from at least one down-sampled sequence,
wherein the video data comprises an encoded bitstream of the video data,
wherein determining the set of facial landmark features comprises up-sampling the at least one down-sampled sequence obtained by decompressing the encoded bitstream,
wherein determining the EFA and determining the set of EFA features comprise up-sampling the at least one down-sampled sequence obtained by decompressing the encoded bitstream, and
wherein determining the EFA and determining the set of EFA features further comprise reconstructing the EFA features, into the reconstructed EFA features, each respective to ones of the facial landmark features of the set of facial landmark features by a generative adversarial network.

6. The apparatus according to claim 5,
wherein the at least one face from the at least one frame of the video data is determined to be a largest face among a plurality of faces in the at least one frame of the video data.

7. The apparatus according to claim 5,
wherein the at least one hardware processor is further configured to execute the computer program code to implement:
  determining a plurality of sets of facial landmark features, other than the set of facial landmark features of the at least one face from the at least one frame of the video data, respect to each of the plurality of faces in the at least one frame of the video data; and
  coding the video data at least partly by the neural network based on the determined set of facial landmark features and the determined plurality of sets of facial landmark features.

8. A non-transitory computer readable medium storing a program causing a computer to execute a process, the process comprising:
  obtaining video data;
  detecting at least one face from at least one frame of the video data;
  determining a set of facial landmark features of the at least one face from the at least one frame of the video data;
  determining an extended face area (EFA) which comprises a boundary area extended from an area of the detected at least one face from the at least one frame of the video data;
  determining a set of EFA features from the EFA; and
  coding the video data at least partly by a neural network based on the determined set of facial landmark features and on aggregating the set of facial landmarks, reconstructed EFA features, and an up-sampled sequence that is up-sampled from at least one down-sampled sequence,
wherein the video data comprises an encoded bitstream of the video data,
wherein determining the set of facial landmark features comprises up-sampling the at least one down-sampled sequence obtained by decompressing the encoded bitstream,
wherein determining the EFA and determining the set of EFA features comprise up-sampling the at least one down-sampled sequence obtained by decompressing the encoded bitstream, and
wherein determining the EFA and determining the set of EFA features further comprise reconstructing the EFA features, into the reconstructed EFA features, each respective to ones of the facial landmark features of the set of facial landmark features by a generative adversarial network.

* * * * *